United States Patent
Li et al.

(10) Patent No.: US 8,266,297 B2
(45) Date of Patent: Sep. 11, 2012

(54) METHOD AND SYSTEM FOR ROUTING

(75) Inventors: Yan Li, Shenzhen (CN); Qifeng Ma, Shenzhen (CN); Stephan Steglich, Berlin (DE); Carsten Jacob, Berlin (DE); Heiko Pfeffer-Orth, Berlin (DE); David Linner, Berlin (DE)

(73) Assignees: Huwei Technologies Co., Ltd., Shenzhen (CN); Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 304 days.

(21) Appl. No.: 12/349,906

(22) Filed: Jan. 7, 2009

(65) Prior Publication Data

US 2009/0117927 A1    May 7, 2009

Related U.S. Application Data

(63) Continuation-in-part of application No. PCT/CN2008/070892, filed on May 6, 2008.

(30) Foreign Application Priority Data

Sep. 13, 2007   (CN) .......................... 2007 1 0145694

(51) Int. Cl.
    *G06F 15/16* (2006.01)
(52) U.S. Cl. ........................ 709/227; 709/249
(58) Field of Classification Search ............... 709/227, 709/249
    See application file for complete search history.

(56) References Cited

U.S. PATENT DOCUMENTS

| | | | |
|---|---|---|---|
| 7,441,429 B1 * | 10/2008 | Nucci et al. ..................... 70/229 |
| 7,720,049 B1 * | 5/2010 | Mikhailov et al. ............. 370/352 |
| 2002/0160810 A1 * | 10/2002 | Glitho et al. ................... 455/560 |
| 2004/0153547 A1 * | 8/2004 | Trossen ........................ 709/228 |
| 2005/0096029 A1 | 5/2005 | Pelaez et al. |
| 2006/0101146 A1 * | 5/2006 | Wang ............................ 709/227 |
| 2006/0245434 A1 * | 11/2006 | Wang et al. ............. 370/395.42 |

FOREIGN PATENT DOCUMENTS

| | | |
|---|---|---|
| CN | 1398103 A | 2/2003 |
| CN | 1417989 A | 5/2003 |
| CN | 1662003 A | 8/2005 |

(Continued)

OTHER PUBLICATIONS

Vitvar, Tomas, et al., "Semantic-enabled Integration of Voice and Data Services: Telecommunication Use Case,"2005, IEEE, Proceedings of the Third European Conference on Web Services (ECE)WS '05) p. 1-12.*

(Continued)

*Primary Examiner* — Haresh N Patel
*Assistant Examiner* — Lawrence Cosby
(74) *Attorney, Agent, or Firm* — Leydig, Voit & Mayer, Ltd.

(57) ABSTRACT

A method and system for routings are disclosed. The method includes: receiving a SIP request message that carries semantic information of a service; by using the semantic information carried in the SIP request message as an input, searching for the service through semantic inference; generating a standard service request message which carries found service information, and sending the message to an application server that handles the service. The present invention increases the quantity of services available for requesting, and improves the flexibility of requesting services.

18 Claims, 10 Drawing Sheets

---

1201. Receive a SIP request message that carries semantic information of a service 1202. Use the semantic information carried in the SIP request message as an input, and search for the service through semantic inference 1203. Generate a standard service request message that carries the found service information, and send the message to an application server that handles the service

FOREIGN PATENT DOCUMENTS

| | | |
|---|---|---|
| CN | 1708167 A | 12/2005 |
| CN | 1870640 A | 11/2006 |
| CN | 1662003 A | 2/2007 |
| WO | WO 2006/029645 A1 | 3/2006 |
| WO | WO 2006/060375 A2 | 6/2006 |

OTHER PUBLICATIONS

First Office Action in corresponding European Application No. 8 748 539.7-2211, mailed Feb. 11, 2010.

Search Report in counterpart European Application No. 08748539.7-2211, mailed Jan. 25, 2010.

Written Opinion in counterpart PCT Application No. PCT/CN2008/070892, mailed Aug. 28, 2008.

Kellerer, Wolfgang, et al., "Preference-based session management for IP-based mobile multimedia signaling," *European Transactions on Telecommunications*, vol. 15, pp. 415-427, Mar. 2004.

Cai, Hong, et al., "Session Initiation Protocol and Web Services for Next Generation Multimedia Applications," *IEEE*, Proceedings of the IEEE Fourth International Symposium on Multimedia Software Engineering (MSE '02), 2002.

Vitvar, Tomas, et al., "Semantic-enabled Integration of Voice and Data Services: Telecommunication Use Case," *IEEE*, Proceedings of the Third European Conference on Web Services (ECOWS '05), 2005.

Yu, JianJun, et al., "Web Service Discovery and Dynamic Invocation Based on UDDI/OWL-S," National Laboratory of Software Development Environment, Beihang University, Beijing, China, 2006.

International Search Report in corresponding PCT Application No. PCT/CN2008/070892, mailed Aug. 28, 2008.

$2^{nd}$ Office Action in corresponding Chinese Application No. 200810135008.3 (Apr. 6, 2011).

$2^{nd}$ Office Action in corresponding European Application No. 08748539.7 (Dec. 23, 2010).

* cited by examiner

*Semantic information:*

```
       ssip:VoiceContactType              ◄──────
--------------------------------------
     <ServiceParameter
           rdf:ID="Parameter">
      <hasContactType
             rdf:resource="#Restaurant"/>
     </ServiceParameter>
   < Restaurant    rdf:ID="Restaurant">
    < serveFood
        rdf:resource="#GermanFood"/>
    < serveFood
        rdf:resource="#ChineseFood"/>
    </Restaurant>
```

*Proxy ontology:*

```
<owl:Class rdf:ID="VoiceContactType">
 <rdfs:subClassOf>
     <owl:Class rdf:ID="ContactType"/>
 </rdfs:subClassOf>
</owl:Class>

<owl:Class rdf:ID="Restaurant">
 <rdfs:subClassOf>
     <owl:Class rdf:ID="Establishment"/>
 </rdfs:subClassOf>
</owl:Class>
    <owl:Class rdf:ID="ServiceParameter"/>
 <owl:Class rdf:ID="Food"/>
    <owl:ObjectProperty rdf:ID="hasContactType">
       <rdfs:domain rdf:resource="#ServiceParameter"/
       <rdfs:range rdf:resource="#Establishment"/>
    </owl:ObjectProperty>
     <owl:ObjectProperty rdf:ID="serveFood">
       <rdfs:domain rdf:resource="#Restaurant"/>
       <rdfs:range rdf:resource="#Food"/>
     </owl:ObjectProperty
  <  Food rdf:ID="ChineseFood"/>
  <  Food rdf:ID="GermanFood"/>
  <  Food rdf:ID=" ItalianFood "/>
```

FIG. 16

METHOD AND SYSTEM FOR ROUTING

CROSS-REFERENCE TO RELATED APPLICATIONS

This application is a continuation-in-part of International Patent Application No. PCT/CN2008/070892, filed May 6, 2008, which claims priority to Chinese Patent Application No. 200710145694.8, filed Sep. 13, 2007, both of which are hereby incorporated by reference in their entirety.

FIELD OF THE INVENTION

The present invention relates to communication technologies, and, in particular, to a method and system for routing.

BACKGROUND OF THE INVENTION

The IP Multimedia Subsystem (IMS) is a new core network domain defined by the 3GPP in the UMTS R5 and later versions, in which a domain is a new mobile network system composed of more than one Network Element (NE). A prominent characteristic of the IMS is that the Session Initiation Protocol (SIP) is used massively to define key NEs and the capabilities and interfaces of the key NEs. For example, the Proxy Call Section Control Function (P-CSCF), Interrogating Call Session Control Function (I-CSCF), and Service Call Session Control Function (S-CSCF) may be regarded as different types of SIP proxies/servers. The Application Server (AS) that provides services is also based on the SIP.

In the process of research, the inventors find that the type and quantity of services are limited in the conventional technology where both the header and the body of the SIP message carry routing information to realize the service triggering capability of the SIP, and the type is limited to voice services. In the conventional technology, the intention of the calling party is represented by carrying some keywords. However, the relevant devices in the IMS network are unable to understand the meaning of the keywords, and, hence, unable to implement auto discovery or invocation of services for users. Consequently, the type and quantity of the services available are restricted by the quantity of keywords. Moreover, different users may use different keywords, which is unfavorable for mass application.

The coupling relationship between the IMS network and the service is unfavorable for dynamic publication of services and dynamic subscription and access to services. A user can only choose to subscribe to the relevant specific service statically, and is unable to subscribe to services as required.

SUMMARY OF THE INVENTION

Embodiments of the present invention provide a method and system for routing to facilitate users to use more types of services through an IMS network, without limiting the quantity of services.

A routing method includes: receiving a SIP request message that carries semantic information of a service; by using the semantic information carried in the SIP request message as an input, searching for the service information through semantic inference; generating a standard SIP service request message which carries the found service information, and sending the standard SIP service request message to an application server that handles the service.

A service network includes: a client end, which further includes a requesting unit adapted to send a SIP request message that carries semantic information of a service; a CSCF, which further includes a forwarding unit adapted to forward the SIP request message that carries semantic information of the service; a proxy server, which further includes a matching unit adapted to search for the service through semantic inference, by using the semantic information carried in the SIP request message as an input; and a routing unit, adapted to generate a standard service request message that carries found service information, and send the message to an application server that handles the service.

A network device includes: a receiving unit, adapted to receive messages, for example, a SIP request message that carries semantic information of a service; a matching unit, adapted to search for the service through semantic inference, by using the semantic information carried in the SIP request message received by the receiving unit as an input; a routing unit, adapted to generate a standard service request message which carries service information found by the matching unit, and send the message to an application server that handles the service.

A client end includes: a selecting unit, adapted to select a service in a service list; a message generating unit, adapted to generate messages, for example, generate a SIP request message that carries semantic description information of the service, according to the service script of the service selected by the selecting unit; a requesting unit, adapted to send requests, for example, a SIP request message that carries the semantic information of the service and is generated by the message generating unit.

A network device includes: a detecting unit, adapted to receive a message, and detect whether the message is a SIP request message that carries semantic information of a service; a forwarding unit, adapted to forward the SIP request that carries the semantic information of the service to a proxy server if the detecting unit detects that the message is a SIP request message.

Another network device includes: a service publication unit, adapted to send service information to a correlated proxy server as requested; and a service processing unit, adapted to receive and process standard service request messages.

BRIEF DESCRIPTION OF THE DRAWINGS

FIG. 16 shows a structure of an extended SIP message in an embodiment of the present invention.

DETAILED DESCRIPTION OF THE INVENTION

In an embodiment of the present invention, by extending the SIP protocol, a SIP service request complying with the semantic format is generated in a client, and a proxy server is set between an IMS network and an application server so that a user interacts with the application server according to semantic logics; a proxy server is added, and the IMS-related service subscription mechanism is extended to implement loose binding between the service and the IMS network, facilitate dynamic and flexible publication of services, and maximally facilitate the user to use various services on the IMS network.

Figure 1:
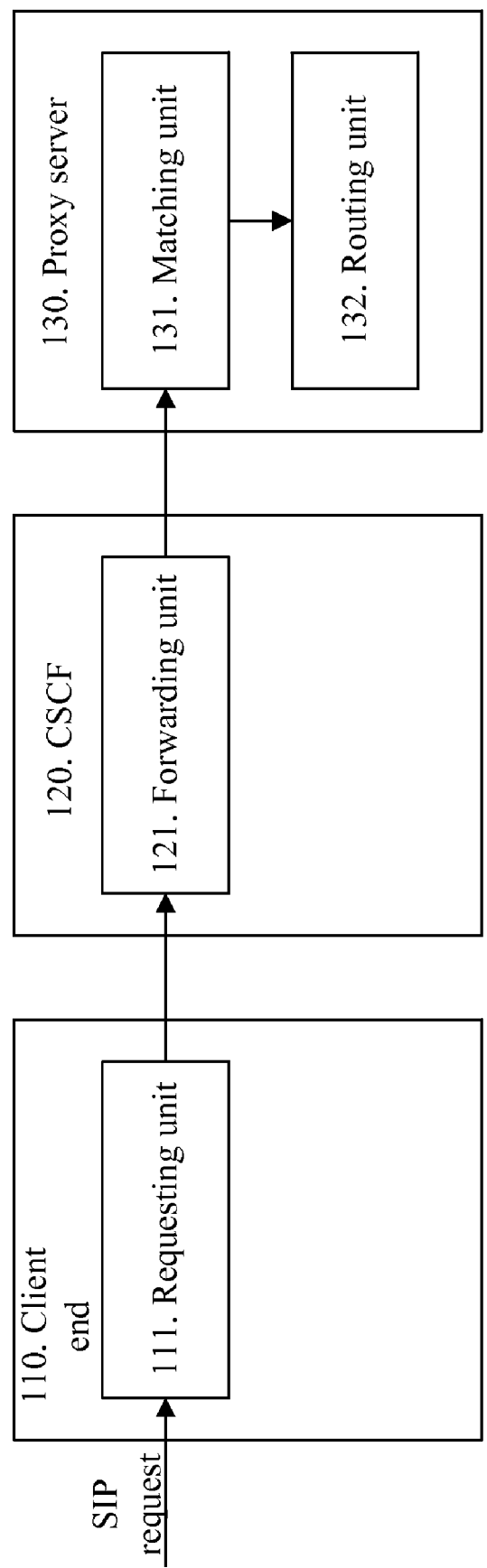
FIG. 1 is a schematic diagram of a service network in the first embodiment of the present invention.

As shown in FIG. 1, a service network provided in a first embodiment of the present invention includes: a client end 110, which includes a requesting unit 111 adapted to send a SIP request message that carries semantic information of a service; a CSCF 120, which includes a forwarding unit 121 adapted to forward the SIP request message that carries semantic information of the service and sent from the requesting unit 111; a proxy server 130, which includes: a matching unit 131, adapted to search for the service through semantic inference by using the semantic information carried in the SIP request message from the forwarding unit 121 as an input; and a routing unit 132, adapted to generate a standard service request message that carries the service information found by the matching unit 131, and send the message to the application server that handles the service.

It is, thus, evident in the foregoing embodiment that the SIP request message of the client end carries semantic information, the CSCF 120 forwards the SIP request message to the proxy server 130, and then the most proper service is searched out through the semantic inference technology intelligently, thus increasing the quantity of requested services massively. The semantics may provide unified machine-understandable languages by means of ontology and descriptive logics. Therefore, the service provision is more dependent on the machine (IMS system), the operation of requesting a service is more intelligent and automatic, and the user uses the IMS service more conveniently and simply. The routing unit 132 generates a standard service request message and sends it to the application server, which is equivalent to setting a service interface between the service application server and the client, thus making the application side and the user side free from limitation of network types and protocol formats.

In this embodiment, the proxy server 130 pre-stores description information of various services, which is an example of different situations. The matching unit 131 may use semantic information as an input and find the corresponding service in the description information of various services.

Figure 2:
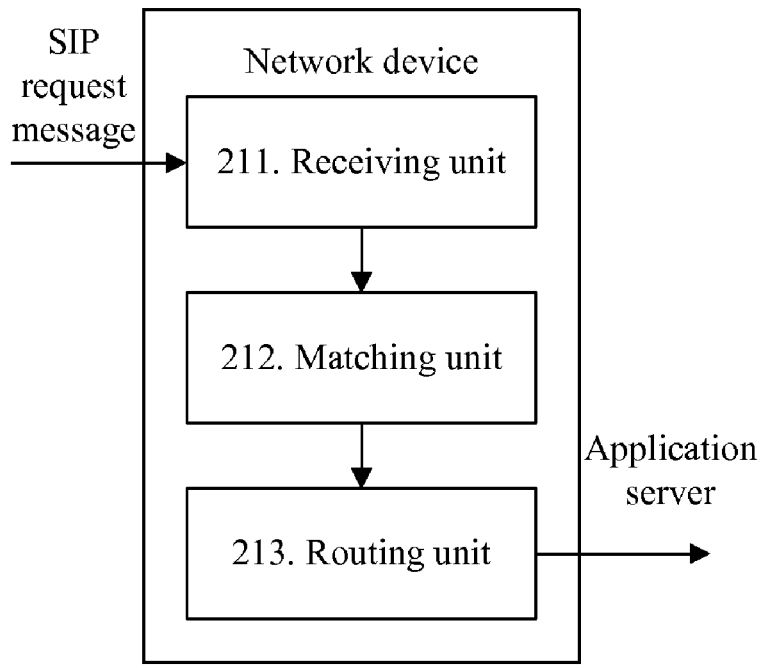
FIG. 2 is a schematic diagram of a network device in the first embodiment of the present invention.

As shown in FIG. 2, a network device provided in the first embodiment of the present invention includes: a receiving unit 211, adapted to receive messages, for example, a SIP request message that carries semantic information of a service; a matching unit 212, adapted to search for the service information through semantic inference, by using the semantic information carried in the SIP request message received by the receiving unit 211 as an input; and a routing unit 213, adapted to generate a standard service request message that carries the service information found by the matching unit 212, and send the standard service request message to an application server that handles the service.

Unlike the conventional technology where the IMS network sends the SIP request triggered by the service to the application server directly, in this embodiment, the matching unit 212 of the device under the present invention searches for the service indicated by the semantic information through semantic inference before sending the SIP request to the service application server; meanwhile, a routing unit 213 is adapted to generate a standard service request message, which is evidently understandable to the application server and lets the application server handle the requested service correctly, thus implementing the function of selecting a route for the service. It is understandable that the network device acts as a proxy server 130 to implement the functions of service route selection, service discovery and triggering.

Figure 3:
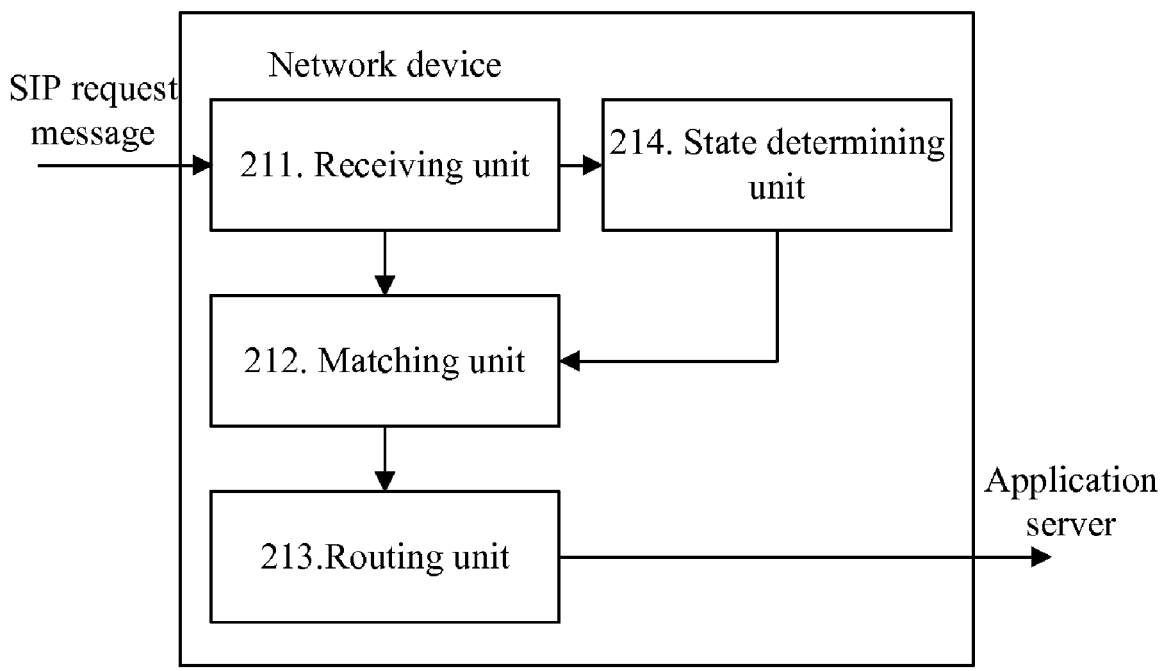
FIG. 3 is a schematic diagram of a network device in the second embodiment of the present invention.

As shown in FIG. 3, the network device in a second embodiment of the present invention is similar to the network device in the first embodiment except that the network device further includes following unit: a state determining unit 214, adapted to select user information of the user which is corresponding to the SIP request message after the SIP request message is received by the receiving unit 211, and input the user information into the matching unit 212, so that the user information may be used together with the semantic information carried in the SIP request message as an input of search by the matching unit 212.

This state determining unit primarily interacts with the relevant network service capability components such as service enablers, and obtains necessary information from the service enablers. For example, the user information of the user which is corresponding to the SIP request message helps the matching unit 212 find the proper service more accurately, according to such information. Besides, one important function of this unit is to aggregate different data obtained by the network capability components, and convert the data into the internal data format available to the matching unit 212.

Figure 4:
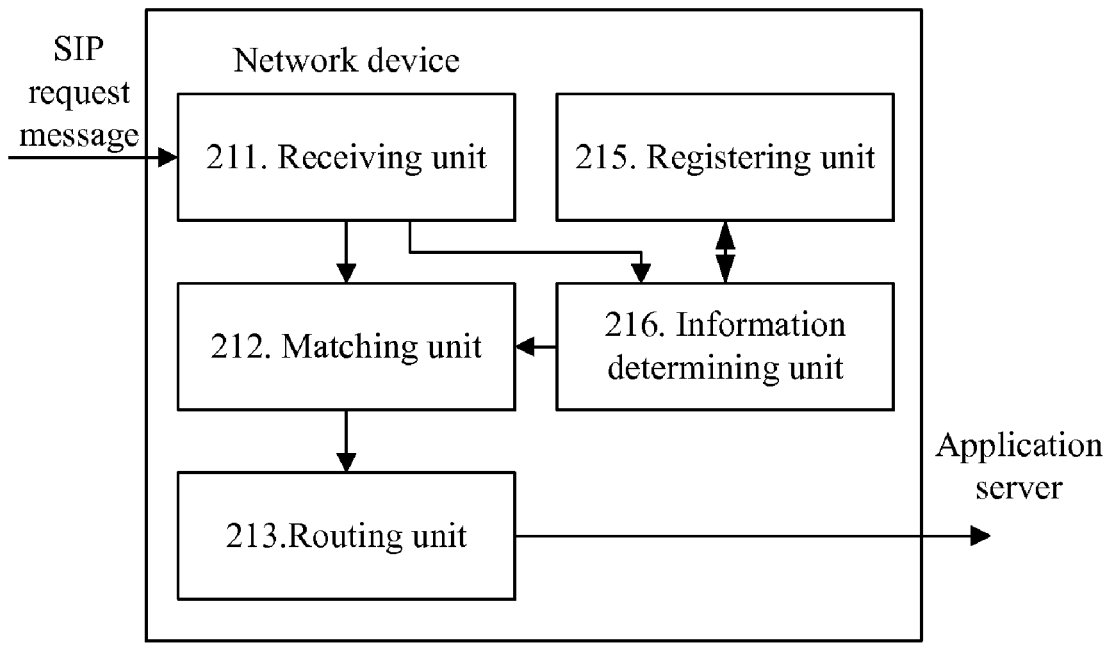
FIG. 4 is a schematic diagram of a network device in the third embodiment of the present invention.

As shown in FIG. 4, the network device in a third embodiment of the present invention is similar to the network device in the first embodiment except that the network device further includes following units: (1) a registering unit 215, adapted to accept service registration on the application server, and store the service description information; or receive and store the service description information from other network devices. Specifically, the registering unit 215 receives the service registration request of the application server first; if any script of this service type exists in the network device, the application server needs to provide description information of this service for the network device, according to the requirement of the script; if no script of this service type exists in the network device, a script of this service type need to be created, then the application server provides description information of this service for the device, according to the requirement of the new script; (2) an information determining unit 216, adapted to input the service description information stored in the registering unit 215 into the matching unit 212, after the receiving unit 211 receives the SIP request message, so that the service description information may be used together with the semantic information carried in the SIP request message as an input of search. That is, the "input" of the search engine uses semantic information as a "keyword," and uses different types of service description information as a "searched database," that is, the search engine searches different types of service description information for the service corresponding to the semantic information.

In this embodiment, a new service may be registered in the network device, and after registration, the service description information will be kept on the network device. Therefore, the information determining unit 216 obtains the service description information from the registration information before the matching unit 212 performs service matching, and provides a retrieval library for the matching unit 212 to search for the service.

Figure 5:
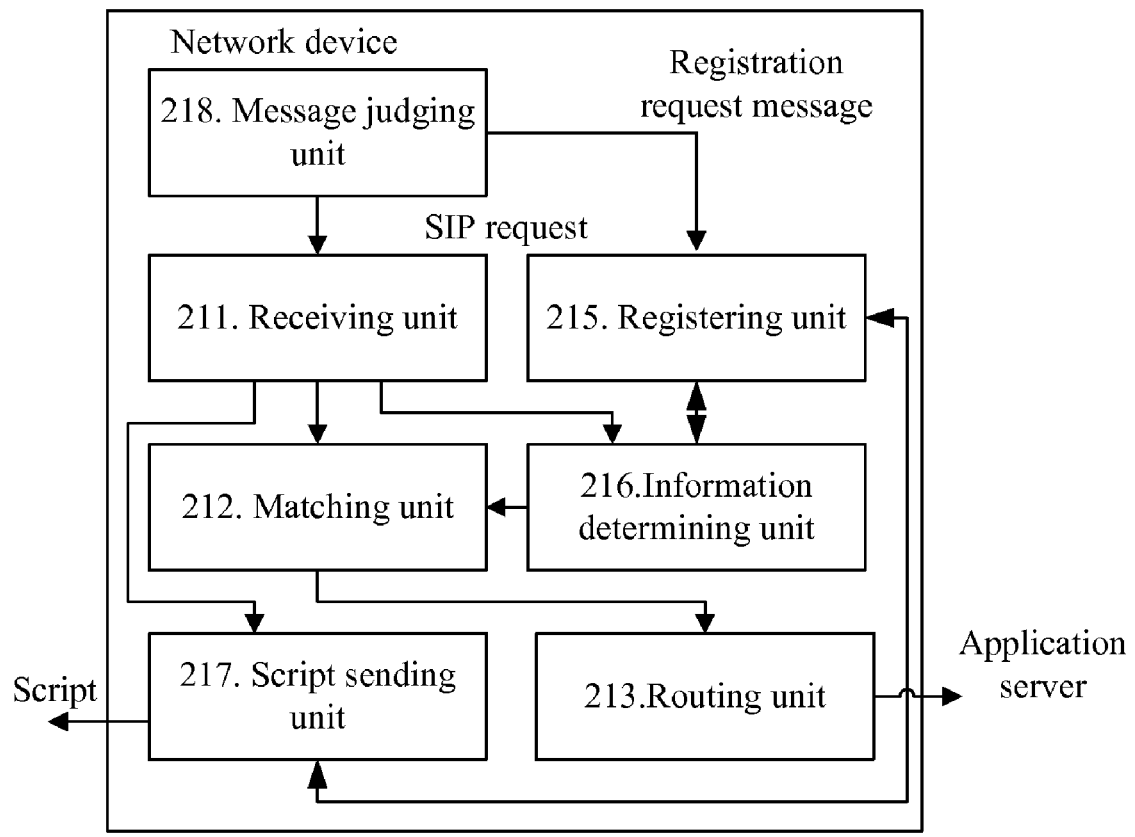
FIG. 5 is a schematic diagram of a network device in the fourth embodiment of the present invention.

As shown in FIG. 5, the network device in a fourth embodiment of the present invention is similar to the network device in the third embodiment except that: the receiving unit 211 receives registration request messages or script request messages; and the network device in the fourth embodiment further includes: a script sending unit 217, adapted to obtain and send the service script corresponding to the requested service in the registering unit 215 after the receiving unit 211 receives a script request message; a message determining unit 218, adapted to determine whether the message received by the receiving unit 211 is a registration request message, script request message, or service request message; if the message is a registration request message, send the registration request message to the registering unit 215; if the message is a script request message, send the script request message to the script sending unit 217; if the message is a service request message, send the service request message to the matching unit 212.

In this embodiment, after a script request message is received, a service script suitable for the script request is obtained from various service scripts stored in the registering unit 215, and then the script sending unit 217 sends the service script obtained. The form of the sent service script may be a service description list, so that the client end can send a SIP service request, according to the format required by the service script. In this way, the services available to the user may be updated dynamically. So that, the user may request any of the actually available services, that is, flexibility of service requesting is improved, and dynamic and flexible publication of services is facilitated. The notification may be sent to the user to update the relevant service information actively, and the user may use relevant services promptly, without subscribing to the services again. Moreover, the user may subscribe to services in combination with the required functions instead of the specific available services. Thus, loose binding between the service and the IMS network is implemented, and the user is maximally facilitated to use various services on the IMS network.

The message determining unit 218 in this embodiment may respond, according to the specific type of the received request, for example, handle the registration request, or script request or SIP service request.

Figure 6:
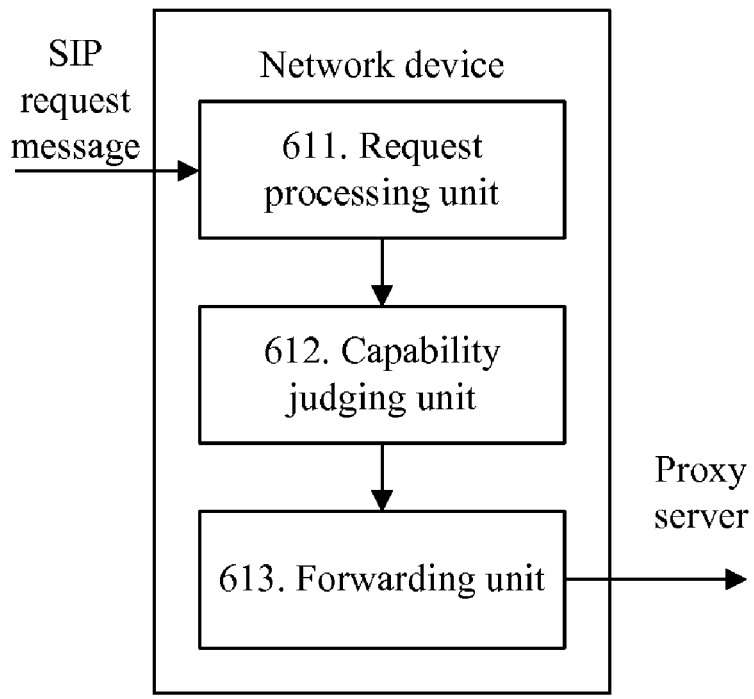
FIG. 6 is a schematic diagram of a network device in the fifth embodiment of the present invention.

As shown in FIG. 6, a network device in a fifth embodiment of the present invention includes: a request processing unit 611, adapted to retrieve the content of the request message received by the receiving unit 211, according to the defined syntax of the extended SIP message, and convert the retrieved message into internal data; a capability determining unit 612, adapted to determine whether a network device is capable of processing the request, after the receiving unit 611 receives the SIP request message that carries semantic information of the service; a forwarding unit 613, adapted to find a proxy server capable of processing the SIP request message in the proxy server information library stored in the network device, if the capability determining unit 612 determines that the network device is incapable.

The request processing unit 611 in this embodiment may retrieve the content of the requested message, according to the syntax of the extended SIP message defined jointly by the sender and the receiver after the receiving unit 211 receives a SIP service request, and convert the retrieved message into internal data understandable to the units of the device to facilitate subsequent processing. The capability determining unit 612 determines whether the device is capable of processing the SIP service request when receiving the request. If the device is capable, the device proceeds with the subsequent operations; otherwise, the forwarding unit 613 forwards the request to the proxy server capable of processing the request.

Corresponding to different service fields and geographic areas, there may be multiple network devices or proxy servers in this embodiment. Such proxy servers may collaborate with each other, and an interconnecting module on the network may connect the proxy servers and let the proxy servers work together. When request messages are not processed on the current proxy server, the interconnecting module forwards the request to a proper proxy server for processing, according to the relevant configuration information.

Figure 7:
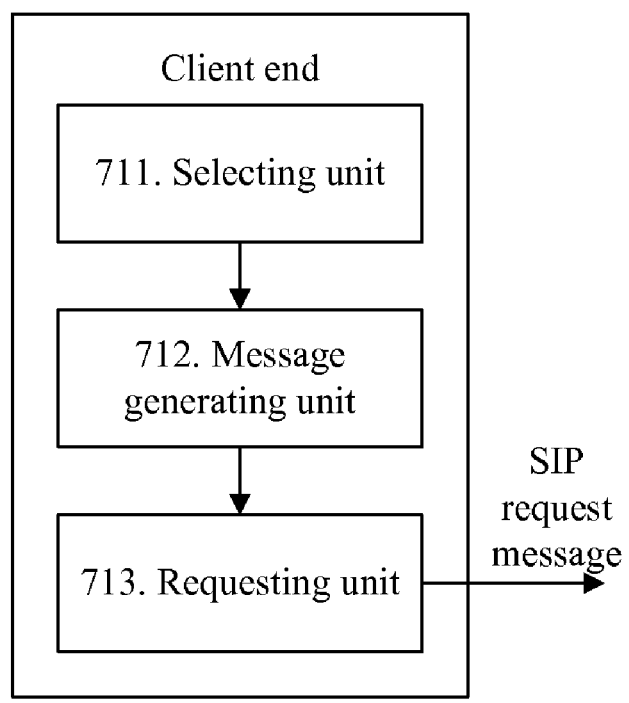
FIG. 7 is a schematic diagram of a client end in the first embodiment of the present invention.

As shown in FIG. 7, the client end provided in the first embodiment of the present invention includes: a selecting unit 711, adapted to select a service in the service list; a message generating unit 712, adapted to generate messages, for example, generate a SIP request message that carries the semantic description information of the service, according to the service script of the service selected by the selecting unit 711; and a requesting unit 713, adapted to send requests, for example, send a SIP request message that carries semantic information of the service and is generated by the message generating unit 712.

This embodiment of the client end may combine with the fourth embodiment of the network device so that the client end may download the list of various services through the relevant proxy servers and the corresponding service script when the user needs to select the relevant service type in the list. The content of this service script includes the description information of this type of service (the description information may be keywords and attribute parameters). The selecting unit 711 selects a service in the service list, and the message generating unit 712 generates a SIP request message that carries the semantic information of the service, according to the service script corresponding to the service, and sends the message to the foregoing network device, thus implementing the function of selecting a route according to semantics.

In other embodiments, the requesting unit 713 may send a request for obtaining a service script and/or service list to obtain the latest service information. The client end may download the information related to the desired service, for example, download the service script of this type of service. When a user needs to use a type of service, the user may find the corresponding service script in the downloaded service list first, and then generate a SIP request message that carries semantic description information, according to the downloaded service script, and send the message to the IMS service network.

Figure 8:
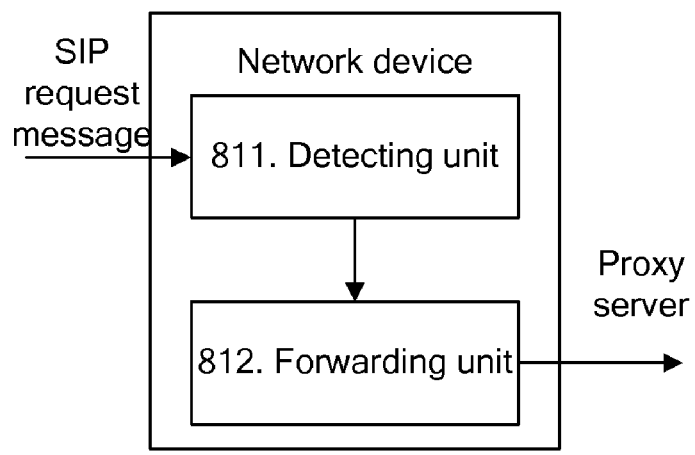
FIG. 8 is a schematic diagram of a network device in the fifth embodiment of the present invention.

As shown in FIG. 8, a network device provided in a sixth embodiment of the present invention includes: a detecting unit 811, adapted to receive messages and detect whether the message is a SIP request message that carries semantic information of a service; and a forwarding unit 812, adapted to forward the SIP request message that carries semantic information of the service to the proxy server, if the detecting unit 811 detects that the message is a SIP request message.

The network device in this embodiment may receive a SIP service request from the client end, and determine whether the message is a SIP request that carries semantic information of the service, screen out such requests, and forward the requests to the proxy server. The network device may be a CSCF, and the CSCF assists in selecting a route.

Figure 9:
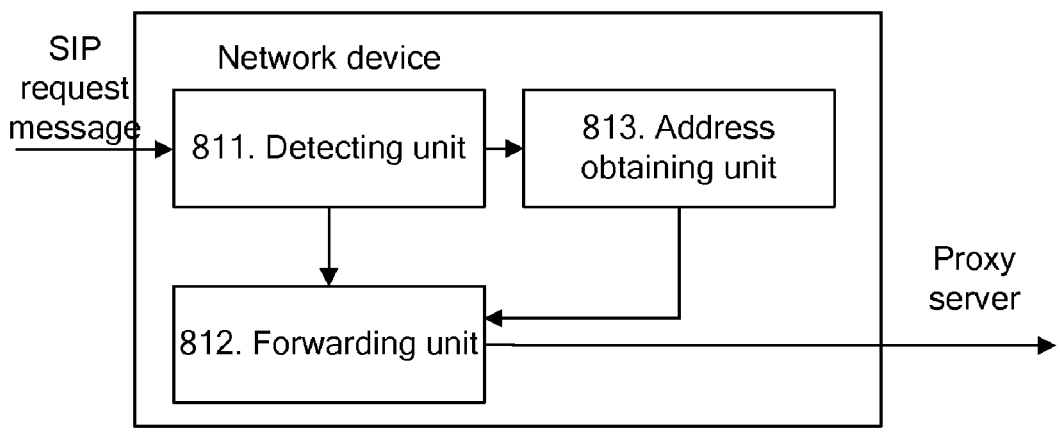
FIG. 9 is a schematic diagram of a network device in the sixth embodiment of the present invention.

As shown in FIG. 9, the network device in a seventh embodiment of the present invention is similar to the network device in the sixth embodiment except for the following additional unit: an address obtaining unit 813, adapted to request the address information of the proxy server corresponding to the service from the Home Subscriber Server (HSS), if the detecting unit 811 detects that the message is a SIP request message, and input the obtained address information to the forwarding unit 812.

This embodiment adds the function of determining the address of the proxy server, and the HSS stores the addresses of the relevant proxy servers. After the network device in this embodiment receives a SIP service request, the address obtaining unit obtains an address of the target proxy server, and sends the SIP service request to the address.

Figure 10:
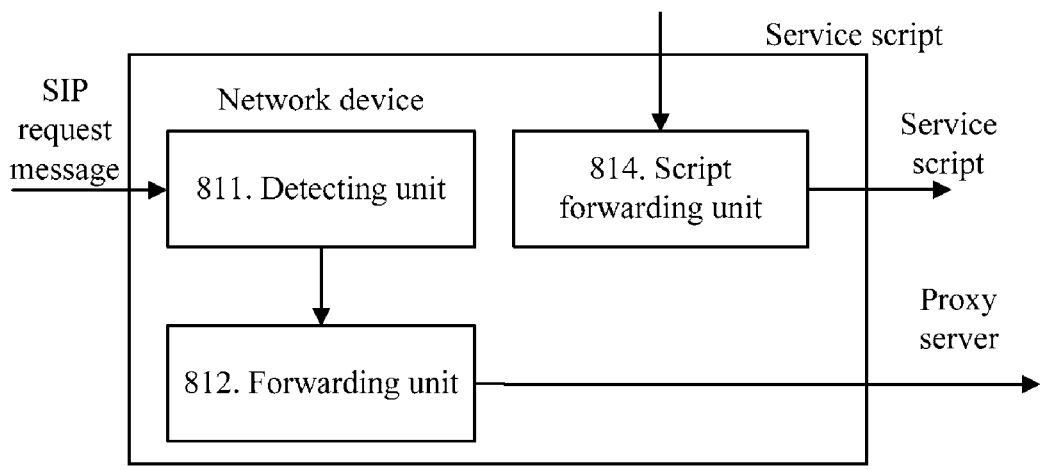
FIG. 10 is a schematic diagram of a network device in the seventh embodiment of the present invention.

As shown in FIG. 10, the network device in an eighth embodiment of the present invention is similar to the network device in the sixth embodiment except for the following additional unit: a script forwarding unit 814, adapted to receive a service script updated by the proxy server, and send the service script to a client end.

The script forwarding unit 814 in this embodiment forwards the updated service script to the client end, which facilitates the client end to use the new service.

Figure 11:
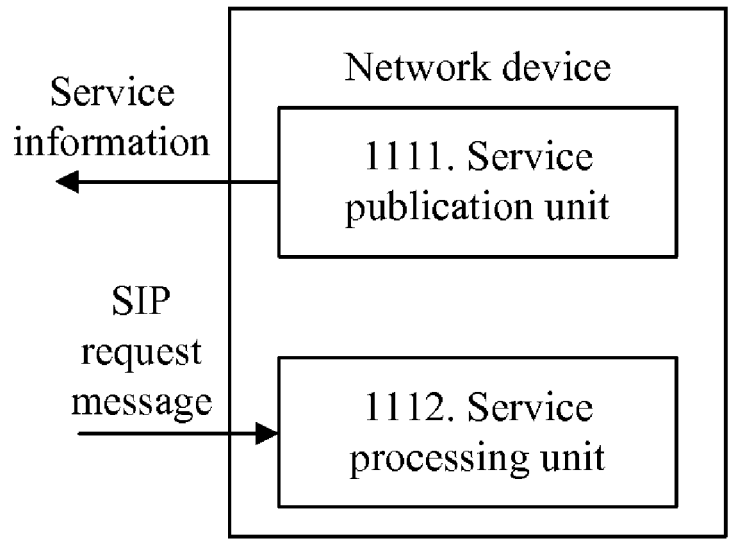
FIG. 11 is a schematic diagram of a network device in the eighth embodiment of the present invention.

As shown in FIG. 11, a network device provided in a ninth embodiment of the present invention includes: a service publication unit 1111, adapted to send service information to a correlated proxy server as requested; and a service processing unit 1112, adapted to receive and process standard service request messages.

In this embodiment, the application server (the network device) finally processes the service request of the client end. Unlike the application server in the conventional technology, the application server in this embodiment may use a service publication unit 1111 to send service description information complying with the requirement, according to the request of the requester, thus facilitating the user to use the service.

However, the service publication unit 1111 may send a service script directly to the correlated proxy server.

It should be noted that the units of the client end 110, CSCF 120 or proxy server 130 in the network in the first embodiment of the present invention may be integrated into one processing module. Likewise, the units of the network device and the client end in foregoing embodiments of the present invention may be integrated into one processing module; or any two or more units in the foregoing embodiments may be integrated into one processing module.

It should also be noted that the units in an embodiment of the present invention may be hardware, and the part that can be implemented through software may be implemented through software function modules. Accordingly, the embodiment of the present invention may be sold or used as an independent product, and the part that can be implemented through software may be stored in a computer-readable storage medium for the purpose of sale or use.

Figure 12:
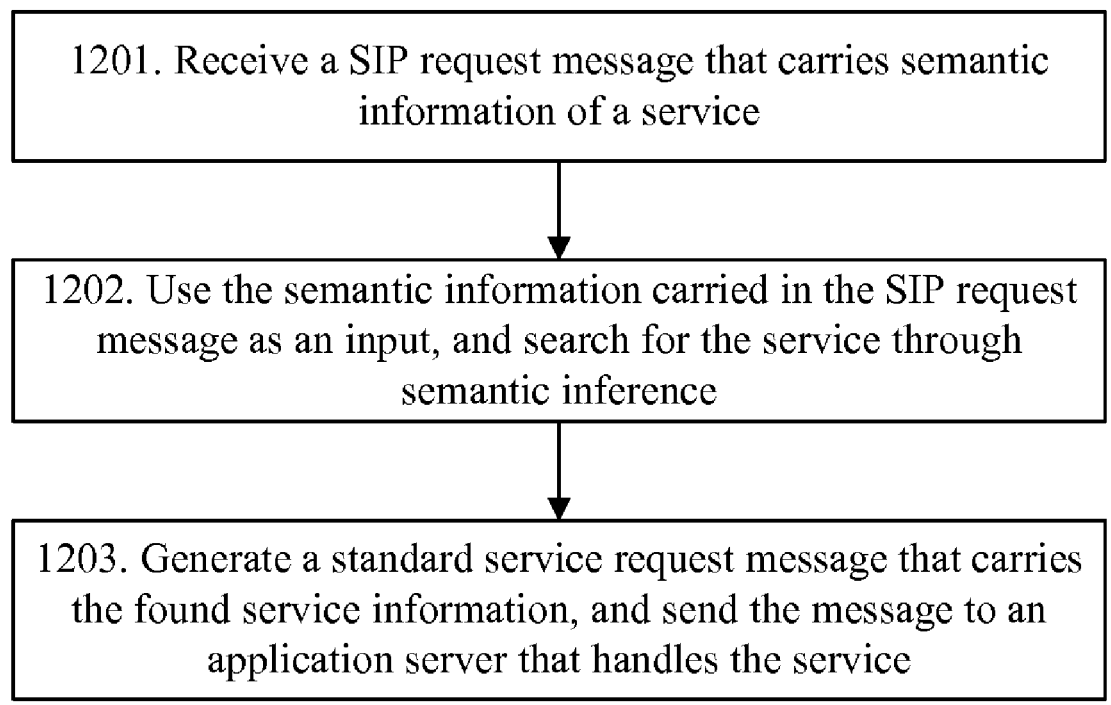
FIG. 12 is a flowchart of a routing method in the first embodiment of the present invention.

As shown in FIG. 12, a first embodiment of a routing method provided includes:

Step 1201: Receiving a SIP request message that carries semantic information of a service.

Step 1202: By using the semantic information carried in the SIP request message as an input, searching for the service through semantic inference.

Step 1203: Generating a standard service request message that carries the found service information and sending the message to an application server that handles the service.

In other embodiments:

In Step 1201, receiving the SIP request message that carries semantic information of the service may be: receiving the SIP request message that carries semantic information of the service and is forwarded by the CSCF 220.

The SIP request message that carries semantic information of the service may be generated in the following way:

(1) Selecting a service in the service list; and
(2) Generating a SIP request message that carries semantic information of the selected service according to the service script corresponding to the selected service.

The service list and the service script are obtained from the proxy server that registers the service.

After Step 1201, in which the SIP request message that carries semantic information of the service is received, the following operations may be performed:

(1) Determining whether the proxy server is capable of processing the request, according to the content of the SIP request message;
(2) If it is determined that the proxy server is incapable, finding the proxy server capable of processing the SIP request message from the proxy server information library stored in the proxy server; and
(3) Sending the SIP request message to all proxy servers capable of processing the request message.
(4) If it is determined that the proxy server is capable of processing the SIP request message, the following operations may be performed: obtaining the user information of the user corresponding to the SIP request message and the description information of the service; by using the user information, service description information and the semantic information carried in the SIP request message together as an input, searching for the service through semantic inference in combination with the ontology library.

In Step 1203, generating a standard service request message that carries the found service information may be: generating a standard service request message, according to the found service information and the SIP request message; or converting the semantic information carried by the SIP request message into a format understandable to the application server; by using the converted semantic information and the found service information as a content, generating a standard service request message.

Figure 13:
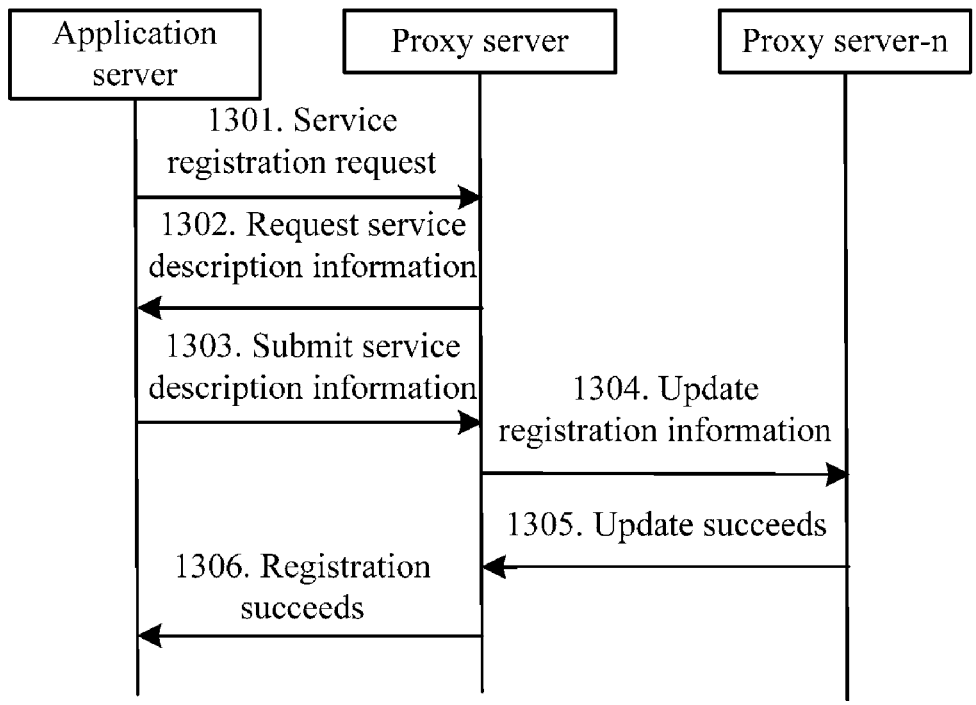
FIG. 13 is a flowchart of service registration in an embodiment of the present invention.

An example of service registration, script downloading and service routing is given below:

(1) First, an application server registers a service with a proxy server. As shown in FIG. 13, the relevant interaction process is as follows:

Step 1301: When a new service is provided, a service registration request message is submitted to the proxy server. The request carries relevant information, such as service name, service type, and service address.

Step 1302: According to the relevant information such as service type, the proxy server requests specific service description information from the application server, according to the requirement of the corresponding service script. If the service has no corresponding service script in the proxy server, a corresponding service script is created manually or automatically.

Step 1303: The application server submits the service description information to the proxy server, for example, information about service functions.

Step 1304: The proxy server notifies other proxy servers of the new service update information after processing, according to the information, such as service type.

Step 1305: Other proxy servers return an update success message.

Step 1306: The application server returns a registration success message to the application server.

Figure 14:
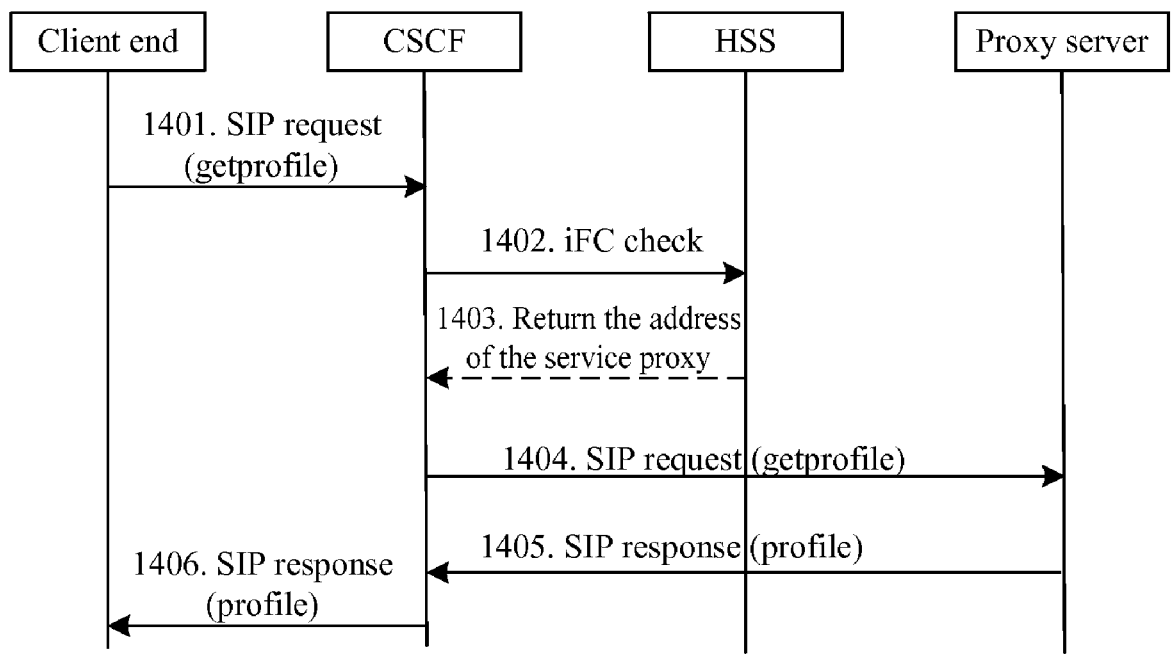
FIG. 14 is a flowchart of script downloading in an embodiment of the present invention.

(2) Second, a client end needs to download the registered service information. As shown in FIG. 14, the relevant interaction process is as follows:

Step 1401: The client end originates a service script request as required, where the request message may specify the address of a proxy server and the relevant service type information. Under certain conditions, the proxy server may choose to send a service script to the user actively.

Step 1402: A CSCF requests initial Filtering Criteria (iFC), according to the SIP Uniform Resource Identifier (URI) to a HSS.

Step 1403: According to the relevant conditions, the HSS returns the address of the proxy server to the CSCF.

Step 1404: The CSCF sends a request message of the user to the proxy server. For example, the request message is a SIP request, such as "get profile."

Step 1405: According to the specific indication of the request message, for example, a "get Profile" indication of "get Profile@Service Proxy," the proxy server returns a service script required by the user to the CSCF.

Step 1406: The CSCF returns a service script to the user.

The proxy server may also send a service list to a client end. When a user uses a specific service, the user selects a service in the list, and then generates the corresponding request message, according to the script.

(3) Third, a user needs to request a service.

Figure 15:
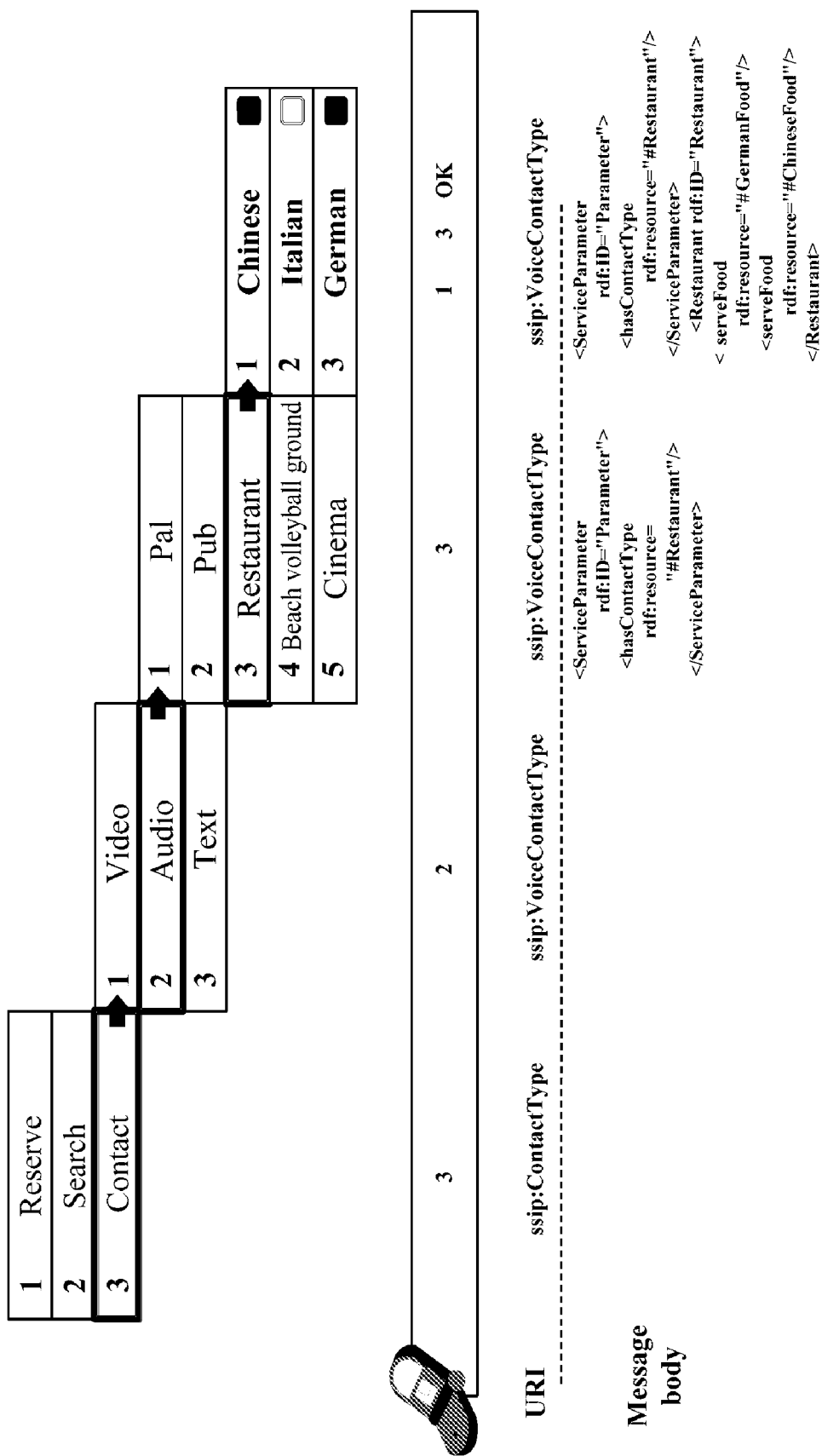
FIG. 15 shows a service list displayed by a client end in an embodiment of the present invention.

After obtaining the service script, the user may select the desired service from the service list and generate a corresponding SIP service request message. The type and quantity of services are unpredictable and dynamically changing. Therefore, this list is laid out hierarchically. The services may be categorized according to the general categorization method such as Global Industry Classification Standard (GICS), or may be categorized according to the requirements of a network operator (according to the ontology information of the relevant service field). The process is illustrated in FIG. 15, and the format of the service list script is as follows:

```
<ServiceList xmlns="http://huawei.com/list.xsd">
 < menu>
    <list>
 <name>book</name>
 </list>
 <list>
 <name> find </name>
 </list>
 <list>
 <name> contact </name>
 </list>
 <list>
 <name> video </name>
 <parent>contact</parent>
 </list>
 <list>
 <name> voice </name>
 <parent>contact</parent>
 </list>
 <list>
 <name> text </name>
 <parent>contact</parent>
 </list>
 <list>
 <name> buddy </name>
 <parent>voice</parent>
 </list>
 <list>
 <name> Restaurant </name>
 <parent>voice</parent>
 </list>
 ...
 < /menu >
 <ServiceDiscription>
          <Restaurant rdf:ID = "LCAIRestaurant">
               <Servefood rdf:resource = "#ChineseFood "/>
     <Servefood rdf:resource = "#GermanFood "/>
 ...
 </ ServiceDiscription >
 ...
</ServiceList >
```

When the user requires a type of service in the list, the SIP client end may download the list information and the corresponding service script through the relevant proxy server. The script primarily includes a template of the description information of this type of service, and may be described through keywords and attribute parameters or through Ontology Web Language (OWL). This embodiment supposes that the script is described through OWL. When sending a service request, the client end may generate an extended SIP service request which carries service description information and complies with the semantic format according to the script, as shown in FIG. 16 or Table 1:

TABLE 1

Format Of A SIP Service Request Message

| Format | Description | Example |
| --- | --- | --- |
| SIP:[Indication]@ [Domain] | Indication: indicating whether to obtain a list or the requested service type. | sip: get script @Proxy server<br>sip: ServiveClassification@Proxy server |
| [protocolID]:[context-ID] | ProtocolID: identifying the SIP request of the extended SIP, where the request carries semantic information.<br>ContextID: identifying the actual requirement, corresponding to semantic description. | ssip: context |

The "Indication" field indicates the intention of different requests. Through the "Indication" field, the SIP client end indicates the intention of obtaining the relevant service list of the proxy server; and, when a type of sub-service is required, indicates the intention of obtaining the semantic description file (whose content is described later) of the sub-service type. Moreover, when the user implements a type of service, the SIP client end may retrieve the ontology information of the service, according to the relevant service description file information to fill the "Indication" field. In this way, the proxy server may perform subsequent operations (the content of operations is described in the relevant process), after receiving the request.

Figure 17:
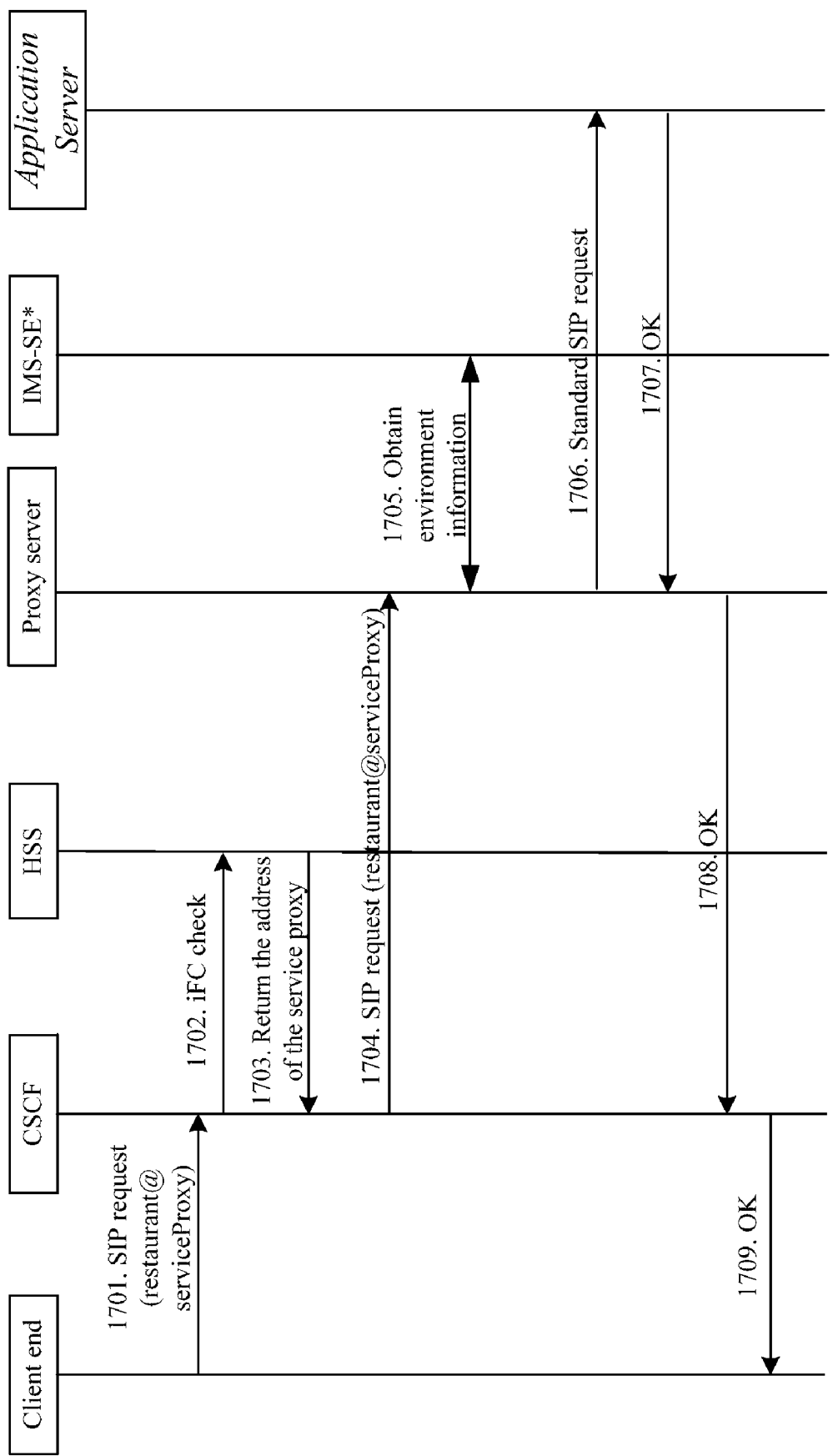
FIG. 17 is a flowchart of service requesting in an embodiment of the present invention.

As shown in FIG. 17, a user requests the service in the following process:

Step 1701: The user requests a restaurant service, and the client end generates a SIP service request message that carries semantic information, according to user requirements and the service script of the relevant restaurant, and sends the SIP service request message to a CSCF.

Step 1702: The CSCF checks the iFC and requests an address of a proxy server from an HSS.

Step 1703: The HSS returns the address of the proxy server to the CSCF.

Step 1704: The CSCF sends the SIP service request message to the proxy server, according to the address of the proxy server.

Step 1705: After receiving the request message, the proxy server analyzes the SIP URI and finds that the intention of the message is to request restaurant services. If the proxy server is not suitable for processing the request message, the proxy server forwards the request to another related proxy server according to the relevant information; if the proxy server is suitable for processing request message, the proxy server requests the relevant service enabler to provide user environment information, such as user location, according to the current user identifier of the request message.

Step 1706: According to the user environment information, the request message and the semantic description information of various services, the proxy server searches out the most appropriate service for the user request automatically through semantic inference, and generates a standard SIP service request message, according to the target service. The standard SIP service request message generated is sent to an application server, according to FIG. 17.

If the target service is a Web service, the proxy server converts the semantic information of the original SIP service request message into semantic information understandable to the final application server according to the semantic description information of the service or the concept conversion template, according to the semantic relations of relevant parameters, and sends the semantic information to the target application server. For the purpose of conciseness, only the SIP message is marked in the figure. The proxy server may generate a Simple Object Access Protocol (SOAP) message, according to the specific request, and sends the message to the target application server.

Step 1707: The application server returns an OK response message to the proxy server.

Step 1708: The proxy server returns an OK response message to the CSCF.

Step 1709: The CSCF returns an OK response message to the client end.

In the foregoing embodiment of the present invention, semantic information is carried in the SIP service request. Therefore, the most appropriate service is searched out through the semantic inference technology intelligently, thus increasing the quantity of requested services massively. The semantics may provide unified machine-understandable languages by means of ontology and descriptive logics. In this way, the service provision is more dependent on the machine (such as IMS system), the operation of requesting a service is more intelligent and automatic, and the user uses the IMS service more conveniently and simply. The standard service request message generated is equivalent to setting a powerful service interface between the application server and the client end, thus making the application side and the user side free from limitation of network types and protocol formats.

It is understandable to those skilled in the art that all or part of the steps of the routing method in the foregoing embodiments may be implemented by hardware following instructions of programs. The programs may be stored in a computer readable storage medium. When the programs are executed, the process includes all or part of the steps of the method in the foregoing embodiments. The storage medium mentioned above may be a ROM/RAM, magnetic disk, compact disk, and so on.

In the final analysis, the embodiments of the present invention provide the following benefits:

1. The quantity of the services available for requesting is increased massively.

The services are queried and selected through semantic logics, thus overcoming the limitation of the service quantity caused by the keyword query mode in the conventional technology. Therefore, the quantity of services available to the user is basically free from limitation of the SIP message.

2. The operation of requesting a service is more intelligent and automatic.

The semantics provide unified and machine-understandable languages by means of ontology and descriptive logics. Therefore, the service provision is more dependent on the machine (such as IMS system), the operation of requesting a service is more intelligent and automatic, and the user uses the IMS service more conveniently and simply.

3. Loose coupling is implemented between the network and the application server.

The routing unit generates a standard service request message and sends it to the application server, which is equivalent to setting a service interface between the application server and the client, thus making the application side and the user side free from limitation of network types and protocol formats. Therefore, the coupling relation between the network and the application server is a loose coupling, which is favorable to dynamic publication of services and dynamic subscription and access to services, thus overcoming the technical problem in the conventional technology, that is, the user can only choose to subscribe to specific services statically in the conventional technology rather than subscribe to services as required.

4. The process of requesting a service is more flexible and convenient.

Through downloading of a script and selection in a service list, the user requests a service more flexibly and conveniently.

The above is a detailed description of a method and system for selecting a route in embodiments of the present invention. Although the invention has been described through some exemplary embodiments, the invention is not limited to such embodiments. It is apparent that those skilled in the art can make various modifications and variations to the invention without departing from the spirit and scope of the invention.

What is claimed is:

1. A routing method, comprising:
sending, by a proxy server, a service list to a client end through IMS network;
selecting, by the client end, a type of service in the service list, obtaining the service script of the selected type of service which includes the description information of the type of service from the proxy server, generating semantic information according to the description information in the service script corresponding to the selected type of service, and generating a Session Initiation Protocol (SIP) request message that carries the semantic information of the selected type of service;
receiving, by the proxy server, the SIP request message that carries the semantic information of the type of service;
finding another type of service through semantic inference, by using the semantic information carried in the SIP request message as an input;
generating a standard service request message which is understandable to an application server and that carries information of the found type of service, and sending the standard service request message to the application server that handles the service;
after receiving the SIP request message:
determining whether the proxy server is capable of processing the SIP request message according to content of the SIP request message;
when determining that the proxy server is incapable, finding a proxy server capable of processing the SIP request message from a proxy server information library stored in the proxy server; and
sending the SIP request message to the proxy servers capable of processing the SIP request message; and
when determining that the proxy server is capable of processing the SIP request message:
obtaining user information of a user corresponding to the SIP request message and description information of the service; by using the user information, service description information and the semantic information carried in the SIP request message together as an input, searching for the service through semantic inference in combination with an ontology library.

2. The routing method of claim 1, wherein the process of generating a standard service request message that carries found service information comprises:
generating the standard SIP or Simple Object Access Protocol (SOAP) service request message, according to the information of the found service and the SIP request message.

3. The routing method of claim 1, wherein the process of generating a standard service request message that carries found service information comprises:
converting semantic information carried by the SIP request message into a format understandable to the application server; by using the converted semantic information and the found service information as a content, generating a standard service request message.

4. A proxy server, comprising:
a script sending unit to obtain and send a service list and a service script to a client end through IMS network, the service script includes the description information of a type of service;
a receiving unit to receive a Session Initiation Protocol (SIP) request message that carries semantic information of a type of service, the of service is selected in the service list by the client end, the semantic information is generated according to the description information in the service script corresponding to the selected type of service and the SIP request message that carries the semantic information is generated;
a matching unit to search for another type of service through semantic inference, by using semantic information carried in the SIP request message received by the receiving unit as an input; and
a routing unit to generate a standard service request message which is understandable to an application server and that carries service information found by the matching unit, and send the standard service request message to the application server that handles the service;
a capability determining unit to determine whether the proxy server is capable of processing the request after the receiving unit receives the SIP request message that carries semantic information of the service; and
a forwarding unit to find a proxy server capable of processing the SIP request message in a proxy server information library stored in the proxy server when the capability determining unit determines that the proxy server is incapable; and
when determining that the proxy server is capable of processing the SIP request message, the matching unit to:
obtain user information of a user corresponding to the SIP request message and description information of the service; by using the user information, service description information and the semantic information carried in the SIP request message together as an input, searching for the service through semantic inference in combination with an ontology library.

5. The proxy server of claim 4, further comprising:
a state determining unit, adapted to select user information of a user corresponding to the SIP request message after the SIP request message is received by the receiving unit, and input the user information into the matching unit, so that the user information is used together with the semantic information carried in the SIP request message as an input of search.

6. The proxy server of claim 4, further comprising:
a registering unit, adapted for one of (1) accepting service registration on the application server, and saving description information of the service; or (2) receiving and saving service description information from other network devices; and
an information determining unit, adapted to, after the receiving unit receives the SIP request message, search for service description information requested by the SIP request message among the service description information stored in the registering unit, and input the description information into the matching unit, so that the description information is used together with the semantic information carried in the SIP request message as an input of search.

7. The proxy server of claim 6, wherein:
the receiving unit receives registration request messages or script request messages;
a script sending unit is adapted to obtain and send a service script corresponding to a requested service in the registering unit after the receiving unit receives a script request message; and
the proxy server further comprises:
a message determining unit, adapted to determine whether the message received by the receiving unit is a registration request message, script request message or service request message; if the message is a registration request message, send the registration request message to the registering unit; if the message is a script request message, send the script request message to the script sending unit; if the message is a service request message, send the service request message to the matching unit.

8. The proxy server of claim 4, further comprising:
a request processing unit, adapted to retrieve content of the request message received by the receiving unit, according to a defined syntax of an extended SIP message, and convert a retrieved message into internal data.

9. The proxy server of claim 7, further comprising:
a capability determining unit, adapted to determine whether the proxy server is capable of processing the request after the receiving unit receives the SIP request message that carries semantic information of the service; and
a forwarding unit, adapted to find a proxy server capable of processing the SIP request message in a proxy server information library stored in the proxy server if the capability determining unit determines that the proxy server is incapable.

10. A service network, characterized by comprising: a proxy server according to claim 4; wherein the service network further comprises:
a Call Session Control Function (CSCF), which comprises a forwarding unit adapted to forward the SIP request message that carries semantic information of the service.

11. The service network of claim 10, further comprising:
a client end, which comprises:
a selecting unit, configured to select a type of service in the service list;
a message generating unit, configured to generate semantic information according to the description information in the service script corresponding to the selected type of service, and generate the SIP request message that carries the semantic information of the selected type of service; and
a requesting unit, configured to send the SIP request message that carries semantic information of the type of service.

12. The service network of claim 10, wherein the CSCF further comprises:
a detecting unit, adapted to receive a message and detect whether the message is a Session Initiation Protocol (SIP), request message that carries semantic information of a service;
where the forwarding unit is adapted to forward the SIP request message that carries semantic information of the service to a proxy server if the detecting unit detects that the message is a SIP request message.

13. The service network of claim 12, the CSCF further comprising:
an address obtaining unit, adapted to request address information of the proxy server corresponding to the service from a Home Subscriber Server (HSS) if the detecting unit detects that the message is a SIP request message, and input the obtained address information into the forwarding unit.

14. The service network of claim 12, the CSCF further comprising:
a script forwarding unit, adapted to receive service script updated by the proxy server, and send the service script to a client end.

15. A non-transitory computer-readable storage medium comprising computer program codes; and when the computer program codes are executed by a computer, the computer program codes cause the computer to execute steps in claim 1.

16. The routing method of claim 1, wherein sending, by a proxy server, a service script to a client end comprises:
receiving, by the proxy server, a service script request message from the client end, where the service script request message specifies the service type information; and
sending, by the proxy server, the service script corresponding to the requested service type information.

17. The routing method of claim 1, wherein the method further comprises:
receiving, by the proxy server, a service registration request message from the application server, which carries the service type;
determining, whether any script of the service type exists in the proxy server;
if any script of this service type exists in the proxy server, requesting, by the proxy server, service description information from the application server, according to the requirement of the corresponding service script;
if no script of this service type exists in the proxy server, creating, by the proxy server, a service script of this service type, and providing, by the application server, service description information to the proxy server according to the requirement of the service script.

18. A service network, comprising a proxy server and a client end, wherein the proxy server comprises:
a script sending unit to obtain and send a service list and a service script to a client end through IMS network, the service script includes description information of a type of service;
a receiving unit to receive an SIP request message that carries semantic information of the type of service,
a matching unit search for another type of service through semantic inference by using the semantic information carried in the SIP request message as an input; and
a routing unit to generate a standard service request message which is understandable to an application server and that carries information of the found service, and send the standard service request message to the application server that handles the service;
the client end comprises:
a selecting unit to select a service in the service fist,
a message generating unit to generate the semantic information according to the description information in the service script corresponding to the selected type of service, and generate the SIP request message that carries semantic information of the selected type of service, and
a requesting unit to send a request for obtaining the service script which includes the description information of the type of service from the proxy server and send the SIP request message that carries semantic information of the type of service;
a capability determining unit to determine whether the proxy server is capable of processing the request after the receiving unit receives the SIP request message that carries semantic information of the service; and
a forwarding unit to find a proxy server capable of processing the SIP request message in a proxy server information library stored in the proxy server when the capability determining unit determines that the proxy server is incapable; and
when determining that the proxy server is processing the SIP request message, the matching unit to:
obtain user information of a user corresponding to the SIP request message and description information of the service; by using the user information, service description information and the semantic information carried in the SIP request message together as an input, searching for the service through semantic inference in combination with an ontology library.

\* \* \* \* \*

UNITED STATES PATENT AND TRADEMARK OFFICE
CERTIFICATE OF CORRECTION

| | | |
|---|---|---|
| PATENT NO. | : 8,266,297 B2 | |
| APPLICATION NO. | : 12/349906 | |
| DATED | : September 11, 2012 | |
| INVENTOR(S) | : Li et al. | |

It is certified that error appears in the above-identified patent and that said Letters Patent is hereby corrected as shown below:

In column 13, line 61, "the of service" should be --the type of service--.

Signed and Sealed this
Eleventh Day of December, 2012

David J. Kappos
*Director of the United States Patent and Trademark Office*